(12) United States Patent  
Chuang

(10) Patent No.: US 7,056,001 B2  
(45) Date of Patent: Jun. 6, 2006

(54) BACK LIGHT MODULE FOR FLAT DISPLAY DEVICE

(75) Inventor: Meng Ju Chuang, Hsinchu (TW)

(73) Assignee: Toppoly Optoelectronics Corp., Chunan (TW)

( * ) Notice: Subject to any disclaimer, the term of this patent is extended or adjusted under 35 U.S.C. 154(b) by 62 days.

(21) Appl. No.: 10/461,510

(22) Filed: Jun. 16, 2003

(65) Prior Publication Data

US 2004/0151007 A1  Aug. 5, 2004

(30) Foreign Application Priority Data

Jan. 30, 2003  (TW)  ................................ 92201788 U

(51) Int. Cl.  
*G02F 1/13357* (2006.01)  
*F21V 7/04* (2006.01)

(52) U.S. Cl. .................. 362/561; 362/555; 362/558; 362/560; 362/609; 362/612; 362/624

(58) Field of Classification Search .............. 362/26, 362/27, 31, 555, 558, 561, 560, 608, 609, 362/612, 613, 621, 623, 625, 624; 349/62–65, 349/67

See application file for complete search history.

(56) References Cited

U.S. PATENT DOCUMENTS

| 4,059,916 | A | * | 11/1977 | Tachihara et al. ............ 349/65 |
| 4,141,058 | A | * | 2/1979 | Mizohata et al. ........... 362/558 |
| 4,460,940 | A | * | 7/1984 | Mori .......................... 362/558 |
| 4,909,604 | A | * | 3/1990 | Kobayashi et al. ........... 349/65 |
| 5,325,271 | A | * | 6/1994 | Hutchisson ................. 362/555 |
| 5,377,083 | A | * | 12/1994 | Tada ........................... 362/31 |
| 5,408,387 | A | * | 4/1995 | Murase et al. ................ 362/31 |
| 5,659,410 | A | * | 8/1997 | Koike et al. .................. 349/62 |
| 5,664,862 | A | * | 9/1997 | Redmond et al. ............. 362/31 |
| 5,671,994 | A | * | 9/1997 | Tai et al. ....................... 362/31 |
| 5,709,447 | A | * | 1/1998 | Murakami et al. ............ 362/31 |
| 5,899,552 | A | * | 5/1999 | Yokoyama et al. ............ 362/31 |
| 6,443,583 | B1 | * | 9/2002 | Ha .............................. 362/608 |
| 6,474,826 | B1 | * | 11/2002 | Tanaka et al. ................ 362/31 |
| 6,502,946 | B1 | * | 1/2003 | Fujino et al. ................. 362/31 |
| 6,779,902 | B1 | * | 8/2004 | Cha et al. ..................... 362/31 |
| 2001/0003504 | A1 | * | 6/2001 | Ishihara et al. ............. 362/555 |
| 2002/0089840 | A1 | * | 7/2002 | Kawakami et al. ......... 362/558 |

\* cited by examiner

*Primary Examiner*—Alan Cariaso  
(74) *Attorney, Agent, or Firm*—Liu & Liu

(57) ABSTRACT

A back light module for flat display device for decreasing the thickness of light guide plate is disclosed. This invention comprises a light guide plate having a first section, a second section and a light-emitting surface; a light source above the light guide plate; a reflector below the light guide plate; and a flexible printed circuit board located at the lateral end of light source wherein most of the light rays emitted from the light source enter into the second section through the first section, then emit from the light-emitting surface.

18 Claims, 3 Drawing Sheets

BACK LIGHT MODULE FOR FLAT DISPLAY DEVICE

BACKGROUND OF THE INVENTION

1. Field of the Invention

The invention relates to a back light module for flat display device, more particularly to a back light module for flat display device by putting the LED light source above one end of the light guide plate.

2. Description of the Prior Art

Among all kinds of flat display devices, A liquid crystal display (LCD) device with low electrical power consumption, low voltage operation, thinner thickness and lighter weight, is widely used in nowadays. A liquid crystal display device typically includes a first substrate having common electrodes and a color filter, and a second substrate having thin film transistors and pixel electrodes. The first substrate and the second substrate are provided substantially in parallel with a predetermined gap therebetween, and liquid crystal is injected between the two opposing substrates. An electric field is formed between the substrates by applying different voltages to the pixel electrodes and common electrodes. Accordingly, the alignment of liquid crystal molecules of the liquid crystal material is varied to thereby control the transmittance of incident light. The visions of liquid crystal display devices (LCD) are extremely excellent since the displayed figures or pictures are not offensive to the eyes of human being unlike light emitting diode (LED). But it is one of the drawbacks of LCD that an additional light module is needed in order to show figures or pictures on the screen under the dark circumstance because LCD does not have the character of light-emitting itself.

LED is a lighting component with low electricity and high illumination, and it has the steady lighting matter and long life cycle, too. It is very suitable as the light source of LCD device. Please refer to FIG. 1, a conventional structure 100 of back light module with LED light source 102 for LCD display device is shown. The light rays emitted from the LED light source 102 enter into the light guide plate (LGP) 104, then are well distributed and emitted out from the light-emitting surface through the reflector 106. The material of light guide plate 104 is usually PMMA or plastic division with $TiO_2$ diffusion grains whose total volume is between about 50%~80% of light guide plate. The light rays are well distributed when they collide with the $TiO_2$ diffusion grains. The reflector 106 is placed below the light guide plate 104 to reflect the downward light rays into the light guide plate 104 for increasing the illumination of back light module 100. There are several light diffusion elements on the bottom surface of the light guide plate 104 for distributing the light rays. The light diffusion elements can be convex and/or concave dots formed by the print method or V-cuts.

Besides, there are sequentially a first diffusor sheet 108, a prism sheet 110, and a second diffusor sheet 112 on the light guide plate 104 for the light rays emitted from the light-emitting surface of light guide plate 104 can be further well distributed into the panel of liquid crystal device (not shown). The numbers of LED are decided on the illumination of the LCD device. Similarly, the numbers of diffusor sheet and prism sheet are decided on the demand of the back light module 100. A flexible printed circuit board (FPC) is put above the LED light source 102 for connecting electrically the pins of LCD device (not shown) and system board (not shown).

However, the aforementioned structure of back light module has many drawbacks. First, the light rays emitted into the light guide plate 104 are not well distributed. As shown in FIG. 2, the illumination of the section A of light guide plate 104 is darker than the section over LED 102 because the illuminating area of each LED is finite, in other words, the serious "firefly" phenomenon is observed because the LED light source 102 is in fact a point light source, not a plane light source. A method that shortens the distance between two LEDs to decrease the area of the section A of light guide plate 104 can solve this problem, but it will need the additional LEDs in the condition of same illuminated area, this method is helpless to reduce manufacturing cost. Next, using the thinner light guide plate can solve the demand for decreasing the thickness of notebook, but the thickness of light guide plate 104 must fit the LED light source 102 for considering the illumination of back light module when the LED light source 102 located at lateral end of light guide plate. So the thickness of back light module and notebook and the manufacturing cost of LCD panel and notebook are not reduced.

SUMMARY OF THE INVENTION

In the light of the state of the art described above, it is an object of the present invention to provide a back light module for flat display device which is immune to the problems of the conventional back light module for flat display device described above.

It is another object of this invention to provide a back light module for flat display device that the LED light source is put above one end of the light guide plate to solve the problem of "firefly phenomenon".

It is a further object of this invention to provide a back light module for flat display device that the LED light source is put above one end of the light guide plate for decreasing the thickness of light guide plate.

In view of the above and other objects which will become apparent as the description proceeds, there is provided according to a general aspect of the present invention a back light module for flat display device which comprises a light guide plate having a first section, a second section and a light-emitting surface; a first reflector below said light guide plate; and a light source above said first section wherein most of the light rays emitted from said light source enter into said second section through said first section, then emit from said light-emitting surface.

Based on the idea described above, wherein said light source includes LED.

Based on the aforementioned idea, wherein the material of said light guide plate is PMMA.

Based on the idea described above, wherein the material of said light guide plate is plastic division.

Based on the aforementioned idea, wherein said light guide plate has a plurality of $TiO_2$ diffusion grains whose total volume is between about 50%~80% of said guide plate.

Based on the idea described above, the back light module for flat display device further comprises a first diffuser sheet on said light guide plate; a prism sheet on said first diffuser sheet; and a second diffuser sheet on said prism sheet.

Based on the aforementioned idea, the back light module for flat display device further comprises a second reflector located at the lateral end of said light guide plate.

Based on the idea described above, wherein said second section has a plurality of light diffusion elements.

Based on the aforementioned idea, wherein said light diffusion element is a V-cut.

Based on the idea described above, wherein said light diffusion element is a convex and/or concave dot.

Based on the aforementioned idea, wherein said convex and/or concave dot is formed by the print method.

Based on the idea described above, wherein said first section has a slanted surface.

Based on the aforementioned idea, wherein the section of said slanted surface for corresponding to said light source has a plurality of light diffusion elements.

Based on the aforementioned idea, wherein the section of said slanted surface for corresponding to said light source has a plurality of light diffusion elements.

Based on the idea described above, wherein said light diffusion element is a V-cut.

Based on the aforementioned idea, wherein said light diffusion element is a convex and/or concave dot.

Based on the idea described above, wherein said convex and/or concave dot is formed by the print method.

Based on the aforementioned idea, wherein said slanted surface is a fully inclined plane.

Based on the idea described above, wherein said slant surface is a curved surface.

Based on the aforementioned idea, wherein said display device is a liquid crystal display device.

Based on the idea described above, the back light module for flat display device further comprises a further printed circuit board (FPC) located at the lateral end of said light source.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
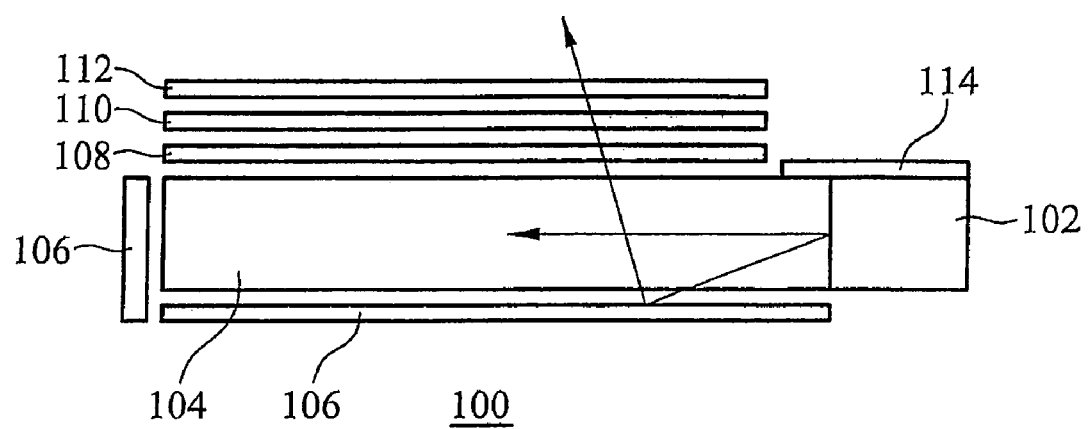
FIG. 1 illustrates a side view of conventional structure of back light module for flat display device.
Figure 2:
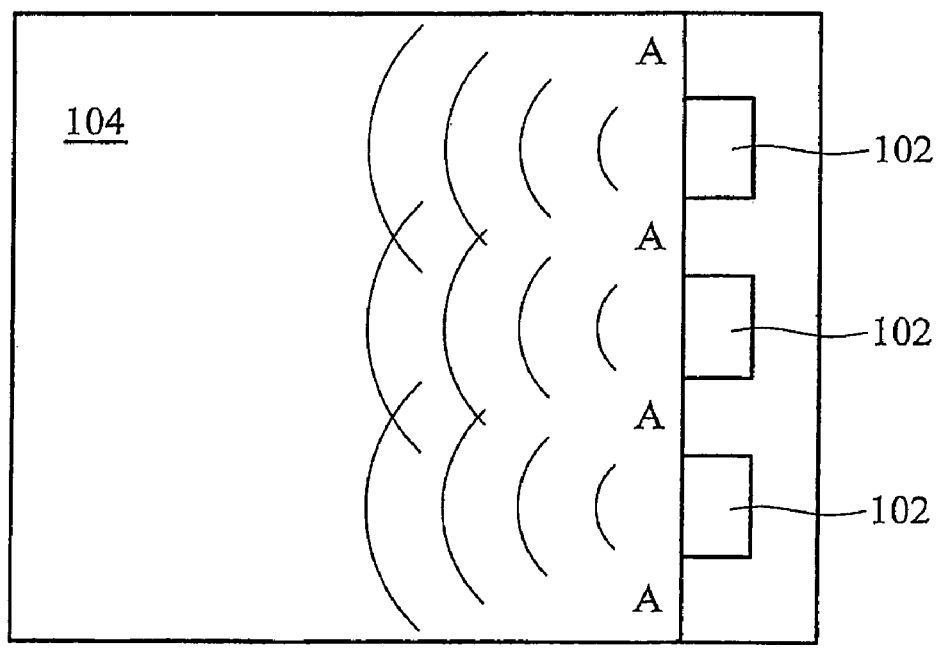
FIG. 2 illustrates a top view of conventional structure of back light module for flat display device.
Figure 3:
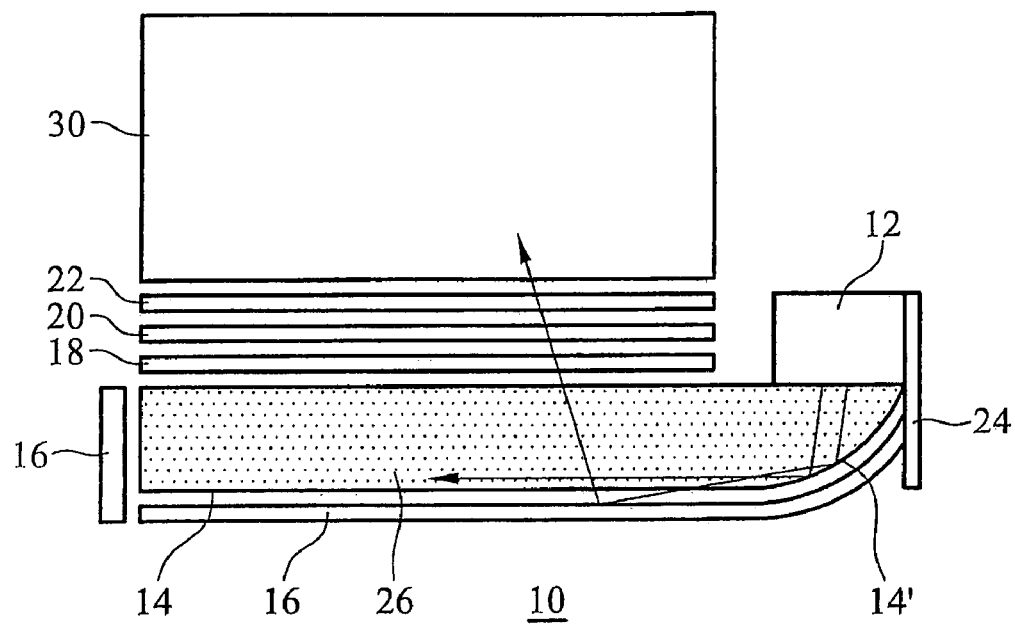
FIG. 3 illustrates a side view of back light module for flat display device according to the embodiment of the present invention.

The embodiment according to this invention is referred to in FIG. 3, a side view of back light module 10 with LED light source 12 for LCD display device according to the present invention is shown. The light rays emitted from the LED light source 12 enter into the light guide plate (LGP) 14, then are well distributed and emitted out from the light-emitting surface through the reflector 16. The material of light guide plate 14 is usually PMMA or plastic division with $TiO_2$ diffusion grains 26 whose total volume is between about 50%~80% of light guide plate. The light rays are well distributed when they are collided with the $TiO_2$ diffusion grains 26. The reflector 16 is placed below the light guide plate 14 to reflect the downward light rays into the light guide plate 14 for increasing the illumination of back light module 10. There are several light diffusion elements on the bottom surface of the light guide plate 14 for distributing the light rays. The light diffusion elements can be convex and/or concave dots formed by the print method or V-cuts.

Besides, there are sequentially a first diffusor sheet 18, a prism sheet 20, and a second diffusor sheet 22 on the light guide plate 14 for the light rays emitted from the light-emitting surface of light guide plate 14 can be further well distributed into the panel of liquid crystal device 30. The numbers of LED are decided on the illumination of the LCD device. Similarly, the numbers of diffusor sheet and prism sheet are decided on the demand of the back light module 10. A flexible printed circuit board 24 (FPC) is located at the lateral end of the LED light source 12 for connecting electrically the pins of LCD device (not shown) and system board (not shown).

Figure 4:
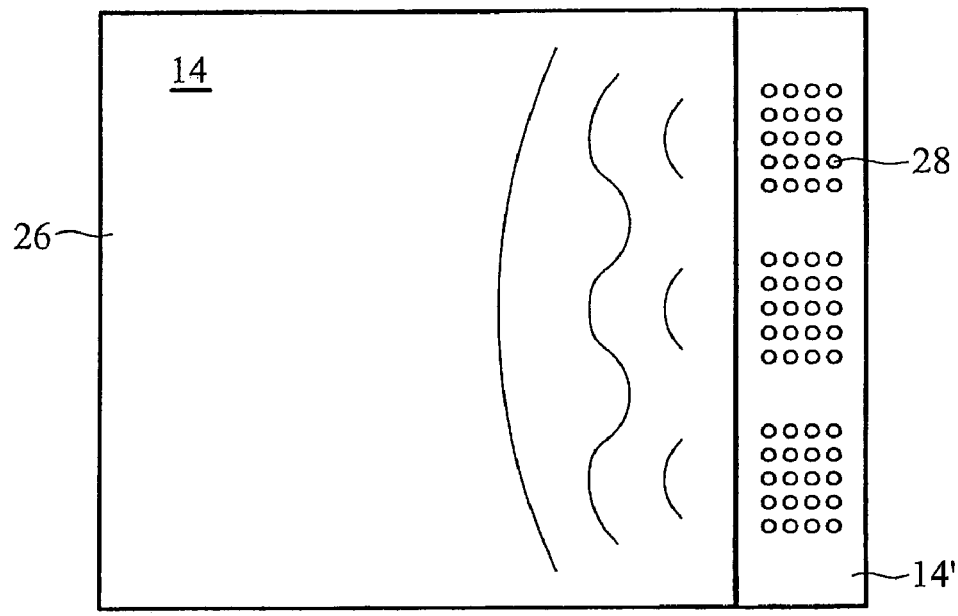
FIG. 4 illustrates a top view of back light module for flat display device according to the embodiment of the present invention.
Figure 5:
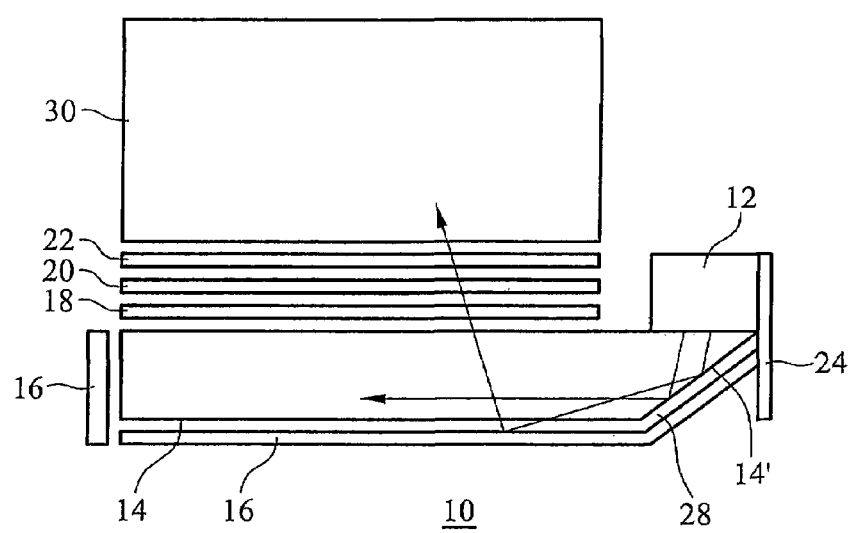
FIG. 5 illustrates a side view of back light module for flat panel display device according to another embodiment.

The location of LED light source changed from at lateral end of light guide plate to above one end of light guide plate and the section of light guide plate below the LED light source changed to a slanted surface 14' are the main differences between the embodiment according to the present invention and the conventional structure of back light module shown as FIG. 3. The thinner light guide plate 14 can be used because the LED light source 12 is located above one end of light guide plate 14 now. It can decrease the thickness of back light module and notebook and reduce the manufacturing cost of LCD panel and notebook. Besides, please refer to FIG. 4, the slanted surface 14' of light guide plate 14 for corresponding to the LED light source 12 has a plurality of light diffusion elements 28 in order to decrease efficiently the "firefly" phenomenon when the light rays emitted from the LED light source 12 enter into the light guide plate 14. The light diffusion element 28 can be a V-cut or a convex and/or concave dot formed by the print method (schematically represented by structures 28 in FIG. 4) and the slanted surface 14' can be a fully inclined plane (see FIG. 5), curved surface (see FIG. 3) or any surface for solving the "firefly" phenomenon.

Although the specific embodiment has been illustrated and described, it will be obvious to those skilled in the art that various modifications may be made without departing from what is intended to be limited solely by the appended claims.

What is claimed is:

1. A backlight module for a flat display device, comprising:
    a light guide plate comprising a top surface that has an edge section, and a bottom surface terminating with a slant surface below the edge section, the slant surface comprising light diffusion elements;
    a reflector below the bottom surface including a slant reflector section below the slant surface; and
    a light source positioned relative to the edge section of the top surface, wherein light from the light source is transmitted through the edge section of the top surface and directed towards the slant reflector section, to be redirected towards the top surface to be emitted through the top surface.

2. The backlight module as in claim 1, wherein the edge section is in the same plane as rest of the top surface.

3. The backlight module as in claim 1, wherein the light source is a point light source.

4. The backlight module as in claim 3, wherein the point light source comprises an LED.

5. The backlight module as in claim 1, wherein the light is redirected towards the top surface by the reflector, including sections of the reflector outside of the slant reflector section.

6. The backlight module as in claim 1, wherein the light guide plate has an lateral end near the edge section, and an opposing lateral end away from the edge section, wherein the reflector comprises a section located at the opposing lateral end.

7. The backlight module as in claim 1, wherein the slant surface comprises a fully inclined plane.

8. The backlight module as in claim 1, wherein the slant surface comprises a curved surface.

9. The backlight module as in claim 1, wherein the light diffusion elements comprise at least one of V-cuts, or convex and/or concave dots.

10. The backlight module as in claim 1, wherein the flat display device comprises a liquid crystal display device.

11. The backlight module as in claim 10, wherein the light guide plate has an lateral end near the edge section, wherein the backlight module further comprising a flexible printed circuit board (FPC) located at the lateral end for providing electrical connections to the liquid crystal display device.

12. The backlight module as in claim 1, wherein material of the light guide plate comprises at least one of PMMA or plastic division.

13. The backlight module as in claim 12, wherein the light guide plate comprises $TiO_2$ difflision grains.

14. The backlight module as in claim 1, further comprising:
 a prism sheet supported on the light guide plate; and
 at least one diffusor sheet supported on the light guide plate.

15. A backlight module for a flat display device, comprising:
 a light guide plate comprising a top surface that has an edge section, and a bottom surface terminating with a slant surface below the edge section;
 a reflector below the bottom surface including a slant reflector section below the slant surface; and
 a point light source positioned above the edge section of the top surface, wherein light from the point light source is directed through the light guide plate towards the slant reflector section, to be redirected towards the top surface.

16. The backlight module as in claim 15, wherein the slant surface comprises light diffusion elements.

17. The backlight module as in claim 15, wherein the point light source comprises an LED.

18. A method of providing backlight for a flat display device, comprising:
 providing a light guide plate comprising a top surface that has an edge section, and a bottom surface terminating with a slant surface below the edge section, the slant surface comprising light diffusion elements;
 providing a reflector below the bottom surface including a slant reflector section below the slant surface; and
 providing a point light source positioned relative to the edge section of the top surface, wherein light from the light source is transmitted through the edge section of the top surface and directed towards the slant reflector section, to be redirected towards the top surface.

\* \* \* \* \*